US009294767B2

(12) United States Patent
Jia

(10) Patent No.: US 9,294,767 B2
(45) Date of Patent: Mar. 22, 2016

(54) INTER PICTURE PREDICTION METHOD FOR VIDEO CODING AND DECODING AND CODEC

(75) Inventor: Jie Jia, Beijing (CN)

(73) Assignee: LG ELECTRONICS (CHINA) R&D CENTER CO., LTD., Beijing (CN)

(*) Notice: Subject to any disclaimer, the term of this patent is extended or adjusted under 35 U.S.C. 154(b) by 510 days.

(21) Appl. No.: 13/819,694

(22) PCT Filed: Aug. 31, 2011

(86) PCT No.: PCT/CN2011/079200
§ 371 (c)(1),
(2), (4) Date: May 8, 2013

(87) PCT Pub. No.: WO2012/028102
PCT Pub. Date: Mar. 8, 2012

(65) Prior Publication Data
US 2014/0003524 A1 Jan. 2, 2014

(30) Foreign Application Priority Data

Sep. 2, 2010 (CN) .......................... 2010 1 0272331
Nov. 19, 2010 (CN) .......................... 2010 1 0552305

(51) Int. Cl.
H04N 19/513 (2014.01)
H04N 19/523 (2014.01)
(Continued)

(52) U.S. Cl.
CPC ......... H04N 19/00684 (2013.01); H04N 19/51 (2014.11); H04N 19/513 (2014.11); H04N 19/523 (2014.11); H04N 19/533 (2014.11); H04N 19/567 (2014.11)

(58) Field of Classification Search
USPC .................................................... 375/240.16
See application file for complete search history.

(56) References Cited

U.S. PATENT DOCUMENTS 8,737,481 B2 * 5/2014 Lee ...................... H04N 19/117
375/240.17
2003/0059089 A1 3/2003 Quinlan et al.
(Continued)

FOREIGN PATENT DOCUMENTS

CN 101212672 7/2008
CN 101641960 2/2010
CN 101641960 A * 2/2010 ........... H04N 19/139

OTHER PUBLICATIONS

International Searching Authority, International Search Report issued in International Application No. PCT/CN2011/079200, mailed Dec. 8, 2011, 2 pages.
(Continued)

Primary Examiner — William C Vaughn, Jr.
Assistant Examiner — Stuart Bennett
(74) Attorney, Agent, or Firm — Hanley, Flight & Zimmerman, LLC

(57) ABSTRACT

The invention discloses an inter picture prediction method for video coding and decoding and a codec. The inter picture prediction method for video coding comprises: performing motion estimation over integer pixel positions of a reference picture, to determine an optimal motion vector for a current prediction unit in a current picture; and performing interpolation filtering processing for motion estimation over fractional pixel position by using the integer pixel position information to which the optimal motion vector directs in the reference picture, and spatially neighboring pixel information of the current prediction unit in the current picture. The inter picture prediction method for video decoding comprises performing decoding to obtain a motion vector in a current decoding unit; and for fractional pixel motion vector, performing interpolation filtering processing by using reference pixels to which the optimal motion vector directs in a reference picture, and spatially neighboring pixels of the current prediction unit in the current picture. The invention can improve the video coding and decoding efficiency, reduce the bit rate necessary for provision of the same video quality, and also reduce nonzero prediction residual signal so as to facilitate the reduction of blocking artifacts.

28 Claims, 5 Drawing Sheets

(51) Int. Cl.
*H04N 19/51* (2014.01)
*H04N 19/533* (2014.01)
*H04N 19/567* (2014.01)

(56) References Cited

U.S. PATENT DOCUMENTS

2008/0175322 A1    7/2008  Lee et al.
2009/0257493 A1*  10/2009  Ye .......................... H04N 7/364
                                                     375/240.12
2009/0257494 A1*  10/2009  Ye .......................... H04N 19/147
                                                     375/240.12

OTHER PUBLICATIONS

The State Intellectual Property Office of China. Office Action, Search Report, and Translations for CN Application No. 201010552305.5. Aug. 13, 2015 (12 pages).

* cited by examiner

INTER PICTURE PREDICTION METHOD FOR VIDEO CODING AND DECODING AND CODEC

FIELD OF THE INVENTION

The present invention relates to the technical field of prediction for motion image coding and interpolation filter, and more particularly to an inter picture prediction method for video coding and decoding and a codec.

BACKGROUND OF THE INVENTION

The compression coding and decoding for motion image is generally classified into two prediction technologies for coding and decoding: inter picture coding and decoding as well as intra picture coding and decoding. The technology of intra picture coding/decoding performs predictive coding/decoding on the current coding/decoding image block by using the information from the coded/decoded image block of the current picture. The technology of inter picture coding/decoding performs predictive coding/decoding on the current coding/decoding image by using the information of the picture which has been coded/decoded.

The technology of inter picture coding/decoding provides the inter picture prediction with as small a residue signal as possible for the current picture by performing interpolation filtering on the reference picture. All the interpolation pixels used in the conventional interpolation filter for the reference picture are from the reference picture. However, the image signal after interpolation is used for predicting the current picture, and the image information of the current picture is failed to be used in the conventional interpolation algorithm.

In the proposals on International Video Compression Coding Standard for nearly two years, there is an algorithm for performing second-order prediction on the inter picture prediction information by using the spatially neighboring information of the current coding/decoding unit in the current picture, among the algorithms for improving the inter picture prediction information for coding/decoding. However, during implementation of the present invention, the inventor finds that all of these algorithms are modifications to the inter picture prediction information, and that the video coding and decoding efficiency is not high.

SUMMARY OF THE INVENTION

The embodiment of the present invention provides an inter picture prediction method for video coding, for improving the video coding efficiency, comprising:

performing motion estimation over integer pixel positions of a reference picture, to determine an optimal motion vector for a current prediction unit in a current picture; and performing interpolation filtering processing for motion estimation over fractional pixel position by using the integer pixel position information to which the optimal motion vector directs in the reference picture, and spatially neighboring pixel information of the current prediction unit in the current picture.

The embodiment of the invention further provides an inter picture prediction method for video decoding, for improving the video decoding efficiency, comprising:

performing decoding to obtain a motion vector in a current decoding unit; and for fractional pixel motion vector, performing interpolation filtering processing by using reference pixels to which the optimal motion vector directs in a reference picture, and spatially neighboring pixels of the current prediction unit in the current picture.

The embodiment of the invention further provides a video coder, for improving the video coding efficiency, comprising:

a motion estimation module, for performing motion estimation over integer pixel positions of a reference picture, to determine an optimal motion vector for a current prediction unit in a current picture; and an interpolation filter module, for performing interpolation filtering processing for motion estimation over fractional pixel position by using the integer pixel position information to which the optimal motion vector directs in the reference picture, and spatially neighboring pixel information of the current prediction unit in the current picture.

The embodiment of the invention further provides a video decoder, for improving the video decoding efficiency, comprising:

a motion vector obtaining module, for performing decoding to obtain a motion vector in a current decoding unit; and an interpolation filter module, for fractional pixel motion vector, for performing interpolation filtering processing by using reference pixels to which the optimal motion vector directs in a reference picture, and spatially neighboring pixels of the current prediction unit in the current picture.

In the embodiment of the present invention, the motion estimation is performed over integer pixel positions of a reference picture, to determine an optimal motion vector for a current prediction unit in a current picture; and the interpolation filtering processing is performed for motion estimation over fractional pixel position by using the integer pixel position information to which the optimal motion vector directs in the reference picture, and spatially neighboring pixel information of the current prediction unit in the current picture, which not only utilizes the information of both the reference picture and the current picture simultaneously to perform inter picture prediction, but also improves the inter picture prediction from the motion estimation phase by using the spatially neighboring pixel information of the current prediction unit in the current picture, thereby improving the video coding efficiency, reducing the bit rate necessary for provision of the same video quality, and also reducing nonzero prediction residual signal so as to facilitate the reduction of blocking artifacts.

In the embodiment of the present invention, decoding is performed to obtain a motion vector in a current decoding unit; and for fractional pixel motion vector, the interpolation filtering processing is performed by using reference pixels to which the optimal motion vector directs in a reference picture, and spatially neighboring pixels of the current prediction unit in the current picture, which not only utilizes the information of both the reference picture and the current picture simultaneously to perform inter picture prediction, but also, at the coding end, improves the inter picture prediction from the motion estimation phase by using the spatially neighboring pixel information of the current prediction unit in the current picture, thereby improving the video decoding efficiency, reducing the bit rate necessary for provision of the same video quality, and also reducing nonzero prediction residual signal so as to facilitate the reduction of blocking artifacts.

BRIEF DESCRIPTION OF THE DRAWINGS

In order to more clearly explain the technical solutions of the embodiments of the invention or of the prior art, the drawings to be used necessary for the description of the embodiments or prior art are simply introduced below. Obviously, the drawings in the following description are some embodiments of the invention. It is possible for persons skilled in the art to obtain other drawings according to these drawings without creative work. In the drawings.

DETAILED DESCRIPTION OF THE EMBODIMENTS

To make the objects, the technical solution and the advantages of the embodiments of the invention clearer, the embodiments of the invention are further explained in detail in connection with the drawings. Herein, the exemplary embodiments of the invention and the explanations thereof are only used to explain the invention, but not to limit the invention.

Figure 1:
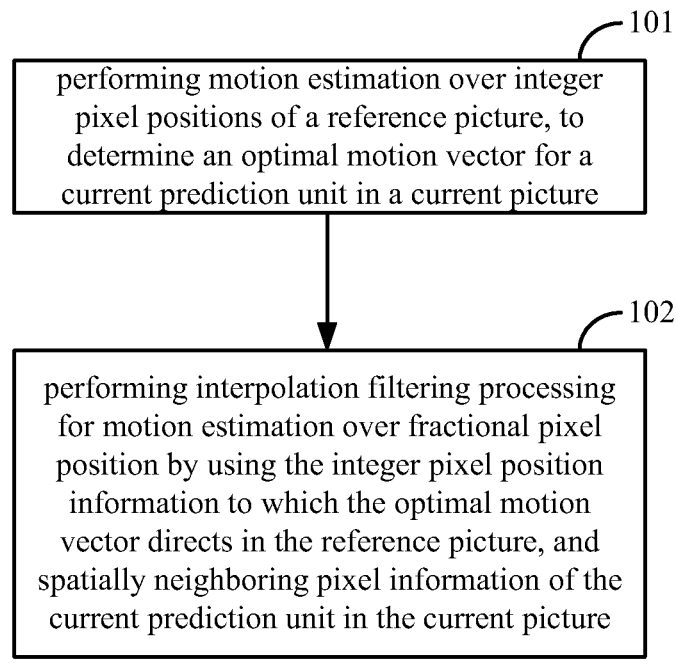
FIG. 1 is a flow chart of processing of the inter picture prediction method for video coding in the embodiment of the invention.

As shown in FIG. 1, in the embodiment of the invention, the processing flow of the inter picture prediction method for video coding may comprise:

step 101, performing motion estimation over integer pixel positions of a reference picture, to determine an optimal motion vector (Motion Vector, MV) for a current prediction unit in a current picture; the optimal motion vector determined herein is the optimal motion vector over integer pixel positions of the current prediction unit in the current picture;

step 102, performing interpolation filtering processing for motion estimation over fractional pixel position by using the integer pixel position information to which the optimal motion vector directs in the reference picture, and spatially neighboring pixel information of the current prediction unit in the current picture.

It can be known from the flow as shown in FIG. 1 that in the embodiment of the present invention, the motion estimation is performed over integer pixel positions of a reference picture, to determine an optimal motion vector for a current prediction unit in a current picture; and the interpolation filtering processing is performed for motion estimation over fractional pixel position by using the integer pixel position information to which the optimal motion vector directs in the reference picture, and spatially neighboring pixel information of the current prediction unit in the current picture, which not only utilizes the information of both the reference picture and the current picture simultaneously to perform inter picture prediction, but also improves the inter picture prediction from the motion estimation phase by using the spatially neighboring pixel information of the current prediction unit in the current picture, thereby improving the video coding efficiency, reducing the bit rate necessary for provision of the same video quality, and also reducing nonzero prediction residual signal so as to facilitate the reduction of blocking artifacts.

Figure 2:
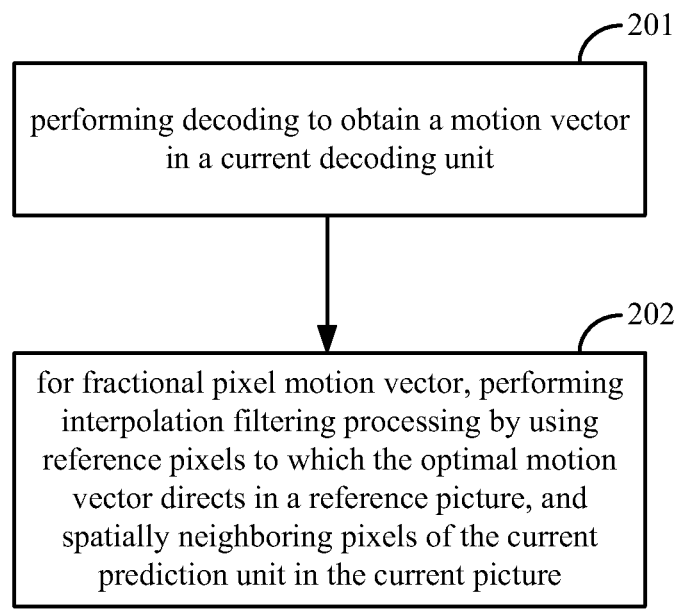
FIG. 2 is a flow chart of processing of the inter picture prediction method for video decoding in the embodiment of the invention.

As shown in FIG. 2, in the embodiment of the invention, the processing flow of the inter picture prediction method for video decoding may comprise:

step 201, performing decoding to obtain a motion vector in a current decoding unit; and step 202, for fractional pixel motion vector, performing interpolation filtering processing by using reference pixels to which the optimal motion vector directs in a reference picture, and spatially neighboring pixels f the current prediction unit in the current picture.

It can be known from the flow as shown in FIG. 2 that in the embodiment of the present invention, decoding is performed to obtain a motion vector in a current decoding unit; and the interpolation filtering processing is performed for fractional pixel motion vector, by using reference pixels to which the optimal motion vector directs in a reference picture, and spatially neighboring pixels of the current prediction unit in the current picture, which not only utilizes the information of both the reference picture and the current picture simultaneously to perform inter picture prediction, but also, at the coding end, improves the inter picture prediction from the motion estimation phase by using the spatially neighboring pixel information of the current prediction unit in the current picture, thereby improving the video decoding efficiency, reducing the bit rate necessary for provision of the same video quality, and also reducing nonzero prediction residual signal so as to facilitate the reduction of blocking artifacts.

The inter picture prediction method for video coding/decoding of the embodiment of the invention is explained in detail by specific examples below. The embodiment of the invention breaks the limit in the conventional inter picture prediction method for video coding/decoding that all the interpolation information are from the reference picture, and proposes the interpolation algorithm for a predicted image by using the coded decodable pixel information in the reference picture and the current picture.

Figure 3:
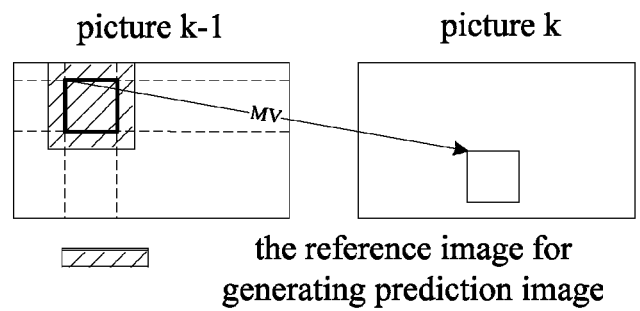
FIG. 3 is a schematic diagram of the conventional inter picture prediction method for video coding/decoding in the embodiment of the invention.

FIG. 3 simply shows the conventional inter picture prediction method for video coding/decoding. In the conventional method, the picture located previously to the current coding/decoding picture in the coding and decoding sequence is used as the reference picture, and the prediction information for coding and decoding of the current picture is provided by performing interpolation filtering on the reference picture. The reference image for generating the prediction image in FIG. 3 is from the reference picture, that is, picture k−1.

Figure 4:
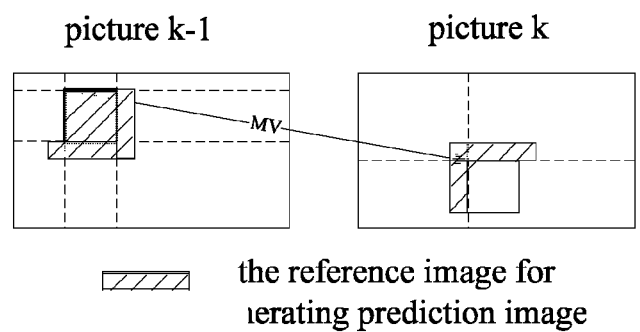
FIG. 4 is a schematic diagram of the inter picture prediction method for video coding/decoding in the embodiment of the invention.

FIG. 4 exemplarily shows the inter picture prediction method for video coding/decoding proposed in the embodiment of the invention. Compared with FIG. 3, it can be seen that in the embodiment of the invention, not only the image data information of the reference picture but also that of the current picture is used. In FIG. 4, the curve of oblique line of picture k indicates the pixel position for calculating the prediction image in the current picture (picture k); the reference image for generating the prediction image in FIG. 4 is from the reference picture (picture k−1) and the current picture (picture k).

In the proposals on International Video Compression Coding and Decoding Standard for nearly two years, there is an algorithm for performing second-order prediction on the inter picture prediction information by using the spatially neighboring information of the current coding/decoding unit in the current picture, among the algorithms for improving the inter picture prediction information for coding. However, all of these are modifications to the inter picture prediction information, and do not relate to the selection of the optimal motion vector.

In the inter picture prediction method for video coding/decoding proposed in the embodiment of the invention, at the coding end, it is to improve the prediction information by using the spatially neighboring pixel information of the current prediction unit in the current picture from the motion estimation phase. Firstly, motion estimation is performed over integer pixel positions of a reference picture, and the interpolation filtering processing is performed for motion estimation over fractional pixel position by using the integer pixel position information to which the optimal motion vector directs in the reference picture, and spatially neighboring pixel information of the current prediction unit in the current picture after an optimal motion vector for a current prediction unit in a current picture is determined. At the decoding end, firstly, a motion vector in a current decoding unit is obtained by decoding; and then the interpolation filtering processing is performed for fractional pixel motion vector, by using reference pixels to which the optimal motion vector directs in a reference picture, and spatially neighboring pixels of the current prediction unit in the current picture.

Figure 5:
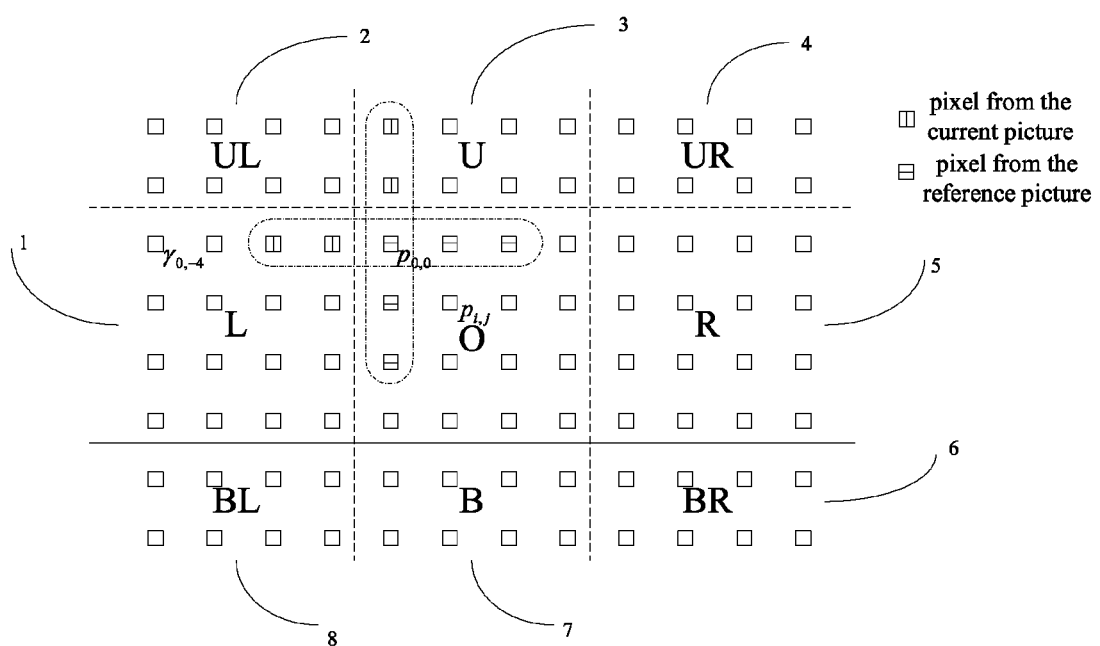
FIG. 5 is a schematic diagram of an interpolation filter algorithm in the embodiment of the invention.

The interpolation filter algorithm at the coding end and the decoding end can be shown in FIG. 5. The interpolation filtering processing is performed in accordance with the following formula.

$$p_{i,j} = \sum_{m=-2}^{2} \sum_{n=-2}^{2} \alpha_{m,n} \gamma_{i-m,j-n}$$

By taking luminance as an example, wherein $\gamma_{i,j}$ is the luminance value of the pixel from the current picture or reference picture participating in filtering of the current prediction unit in the current picture, $p_{i,j}$ is the luminance value of the prediction pixel obtained by the interpolation filtering processing, $\alpha_{m,n}$ is the filter coefficient, (i, j) is the position of the current pixel, and (m, n) is the position of the prediction pixel.

If (i−m)<0 and (j−n)<3, or (j−n)<0, $\gamma_{i-m,j-n}$ is the luminance value from the current picture, as shown in sections 1-4 of FIG. 5; otherwise, $\gamma_{i-m,j-n}$ is the luminance value of the pixel from the reference picture, as shown in sections 5-8 in FIG. 5.

If taking chroma as an example, in the above formula, $\gamma_{i,j}$ is the chroma value of the pixel from the current picture or reference picture participating in filtering of the current prediction unit in the current picture, $p_{i,j}$ is the chroma value of the prediction pixel obtained by the interpolation filtering processing, $\alpha_{m,n}$ is the filter coefficient, (i, j) is the position of the current pixel, and (m, n) is the position of the prediction pixel. If (i−m)<0 and (j−n)<3, or (j−n)<0, $\gamma_{i-m,j-n}$ is the chroma value from the current picture; otherwise, $\gamma_{i-m,j-n}$ is the chroma value of the pixel from the reference picture.

The inter picture prediction method for video coding/decoding proposed in the embodiment of the invention contains all the methods for generating the prediction image in the way of the embodiment of the invention, covering various methods for generating the filter coefficient $\alpha_{m,n}$.

In implementation, after performing the above interpolation filtering processing at the coding end, it further comprises: performing motion estimation over integer and fractional pixel positions based on interpolated samples from the interpolation filtering processing; and selecting the optimal motion vector which provides an optimal prediction for coding of the current prediction unit according to the motion estimation result.

Figure 6:
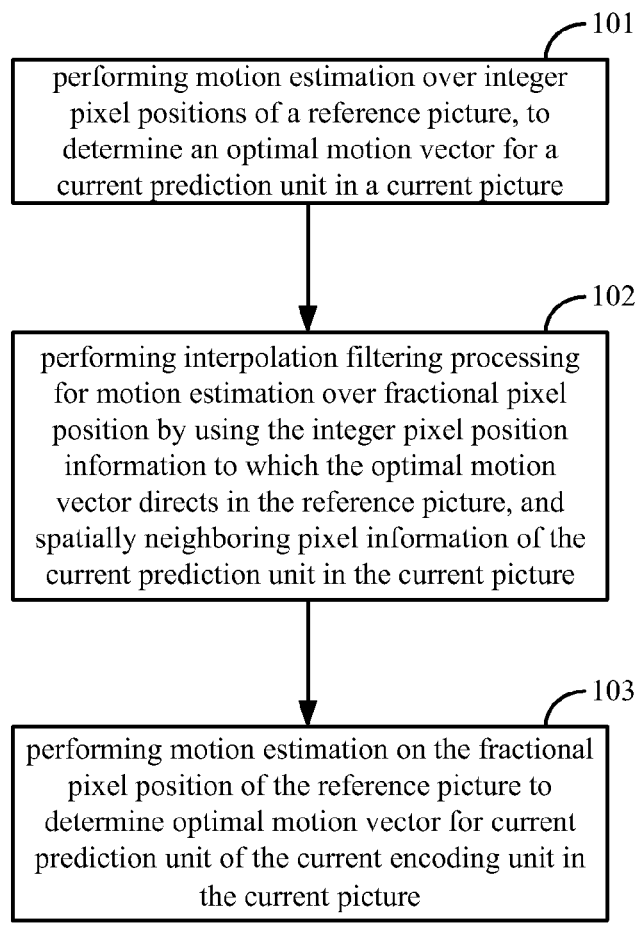
FIG. 6 is a flow chart of processing of one example of the inter picture prediction method for video coding in the embodiment of the invention.

For example, performing motion estimation on an intermediate value of the prediction information for coding obtained after the interpolation filtering processing may comprise: performing the motion estimation to determine motion vector at fractional pixel position for coding. The fractional pixel position herein can be ½ pixel position and ¼ pixel position. Obviously, ½ pixel position and ¼ pixel position are only examples and the fractional pixel position can be other pixel positions during implementation, for example, ⅛, 1/16 pixel positions. As shown in FIG. 6, during implementation, in the flow as shown in FIG. 1, it is possible to execute step 103 after execution of step 102; performing motion estimation on the fractional pixel positions of the reference picture to determine optimal motion vector for current prediction unit of the current encoding unit in the current picture.

For example, selecting the optimal motion vector as the prediction information for coding of the current picture according to the motion estimation result may comprise: selecting the motion vector corresponding to the minimum RDcost as the optimal motion vector, to be the prediction information for coding of the current picture according to the motion estimation result. The selection of the motion vector corresponding to the minimum RDcost as the optimal motion vector herein is only an example, and the optimal motion vector can be selected according to other parameters during implementation.

It can be known from the above embodiment that the spatially neighboring pixel information of the current prediction unit in the current picture is applied to perform image interpolation when the video coding/decoding inter picture prediction is performed in the embodiment of the invention, so as to make the prediction image more similar to the current image. The embodiment of the invention can provide effective inter picture prediction information, thereby improving the video compression coding and decoding efficiency.

During implementation, the method for interpolation-generating a reference image for predicting the current image block in the embodiment of the invention is selectable. The reference image may be the reference picture image block, or may be the current picture image block and reference picture image block. The method corresponding to the one for image prediction generating the minimum predicted error is taken as the optimal method to be used. That is, according to the coding value obtained by the context-adaptive binary arithmetic coding (CABAC), the method is selected to execute the inter picture prediction method for video coding/decoding.

Specifically, when applying the context-adaptive binary arithmetic coding way, it can be assumed that the prediction method 0 indicates to apply the conventional method, all the reference images are from the picture previous to the current picture according to the coding and decoding sequence; the prediction method 1 indicates to apply the algorithm proposed by the embodiment of the invention, that is the method to which the flows in FIGS. 1 and 2 relate, for example, the prediction image is generated by using the images at the upper part and the left part of the current image block in the current picture. In this way, the way of generating the optimal predicted image according to the coding value obtained by the context-adaptive binary arithmetic coding can save the bit overhead brought by the coding and decoding prediction way.

Based on the same inventive thought, the embodiment of the invention further provides a video coder and a video decoder, as described in the following embodiment. Since the principle of the video coder/video decoder to solve problems is similar to the inter picture prediction method for video coding/decoding, the implementation of the video coder/video decoder can refer to the implementation of the inter picture prediction method for video coding/decoding, and it is unnecessary to give more details.

Figure 7:
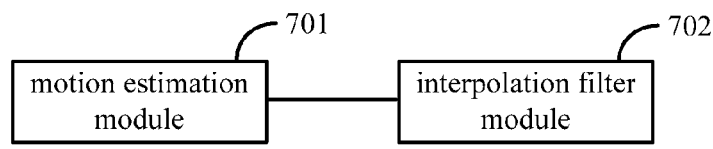
FIG. 7 is a schematic diagram of the structure of the video coder in the embodiment of the invention.

As shown in FIG. 7, the video coder in the embodiment of the invention may comprise:

a motion estimation module 701, for performing motion estimation over integer pixel positions of a reference picture, to determine an optimal motion vector for a current prediction unit in a current picture; and an interpolation filter module 702, for performing interpolation filtering processing for motion estimation over fractional pixel position by using the integer pixel position information to which the optimal motion vector directs in the reference picture, and spatially neighboring pixel information of the current prediction unit in the current picture.

Figure 8:
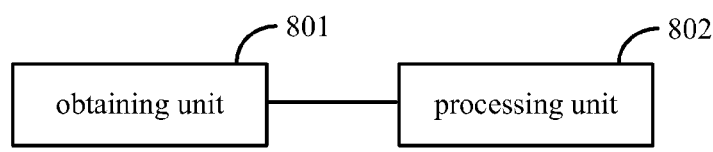
FIG. 8 is a schematic diagram of the structure of the interpolation filter module in the video coder of the embodiment of the invention.

As shown in FIG. 8, the interpolation filter module 702 in one embodiment may comprise:

an obtaining unit 801, for obtaining the integer pixel position information to which the optimal motion vector directs in the reference picture, and spatially neighboring pixel information of the current prediction unit in the current picture; and a processing unit 802, for performing the interpolation filtering processing according to the following formula:

$$p_{i,j} = \sum_{m=-2}^{2} \sum_{n=-2}^{2} \alpha_{m,n} \gamma_{i-m,j-n}$$

By taking luminance as an example, wherein is the luminance value of the pixel form the current picture or reference picture participating in filtering of the current prediction unit in the current picture, $p_{i,j}$ is the luminance value of the prediction pixel obtained by the interpolation filtering processing, $\alpha_{m,n}$ is the filter coefficient, (i, j) is the position of the current pixel, and (m, n) is the position of the prediction pixel.

If (i−m)<0 and (j−n)<3, or (j−n)<0, $\gamma_{i-j-n}$ is the luminance value from the current picture; otherwise, $\gamma_{i-m,j-n}$ is the luminance value from the pixel participating in filtering in the reference picture.

If taking chroma as an example, in the above formula, $\gamma_{i,j}$ is the chroma value of the pixel form the current picture or reference picture participating in filtering of the current prediction unit in the current picture, $p_{i,j}$ is the chroma value of the prediction pixel obtained by the interpolation filtering processing, $\alpha_{m,n}$ is the filter coefficient, (i, j) is the position of the current pixel, and (m, n) is the position of the prediction pixel. If (i−m)<0 and (j−n)<3, or (j−n)<0, $\gamma_{i-m,j-n}$ is the chroma value from the current picture; otherwise, $\gamma_{i-m,j-n}$ is the chroma value of the pixel from the reference picture.

Figure 9:
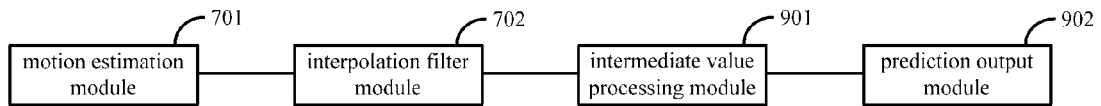
FIG. 9 is a schematic diagram of the structure of one example of the video coder as shown in FIG. 7 in the embodiment of the invention.

As shown in FIG. 9, in one embodiment, the video coder shown in FIG. 7 may further comprise:

an intermediate value processing module 901, for performing motion estimation over integer and fractional pixel positions based on interpolated samples from the interpolation filtering processing; and a prediction output module 902, for selecting the optimal motion vector which provides an optimal prediction for coding of the current prediction unit according to the motion estimation result.

In one embodiment, the intermediate value processing module 901 can be specifically used for:

performing the motion estimation to determine motion vector at fractional pixel position for coding.

Figure 10:
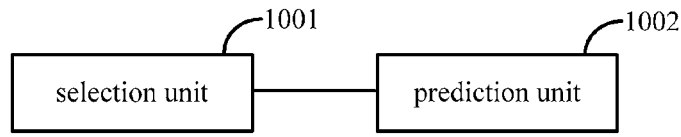
FIG. 10 is a schematic diagram of the structure of the prediction output module in the video coder in the embodiment of the invention.

As shown in FIG. 10, in one embodiment, the prediction output module 902 may comprise:

a selection unit 1001, for selecting the motion vector corresponding to the minimum RDcost according to the motion estimation result; and a prediction unit 1002, for determining the selected motion vector as the optimal motion vector, which provides an optimal prediction information for coding of the current picture.

Figure 11:
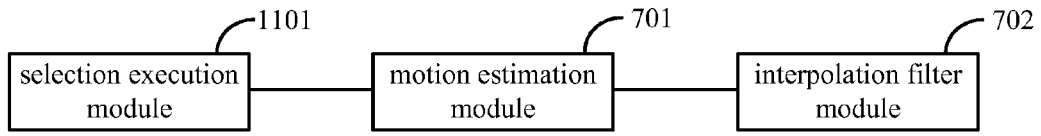
FIG. 11 is a schematic diagram of the structure of an example of the video coder as shown in FIG. 7 in the embodiment of the invention.

As shown in FIG. 11, in one embodiment, the video coder as shown in FIG. 7 may comprise:

a selection execution module 1101, for selecting to start the video coder shown in FIG. 7 to perform execution according to the coding value obtained by the context-adaptive binary arithmetic coding CABAC. It is obvious that the video coder shown in FIG. 9 can further comprise the selection execution module 1101.

Figure 12:
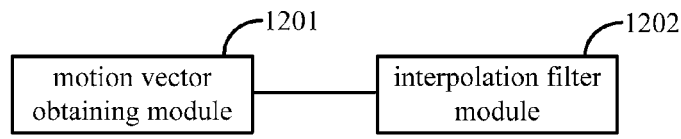
FIG. 12 is a schematic diagram of the structure of the video decoder in the embodiment of the invention.

As shown in FIG. 12, in the embodiment of the invention, the video decoder may comprise:

a motion vector obtaining module 1201, for performing decoding to obtain a motion vector in a current decoding unit; and an interpolation filter module 1202, for fractional pixel motion vector, for performing interpolation filtering processing by using reference pixel position information to which the optimal motion vector directs in a reference picture, and spatially neighboring pixel information of the current prediction unit in the current picture.

Figure 13:
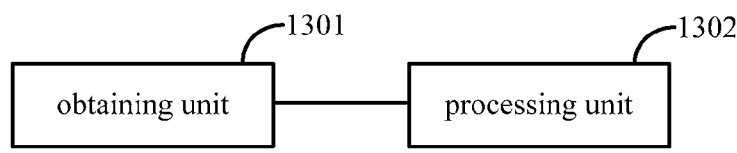
FIG. 13 is a schematic diagram of the structure of the interpolation filter module in the video decoder in the embodiment of the invention.

As shown in FIG. 13, the interpolation filter module 1202 in one embodiment may comprise:

an obtaining unit 1301, for obtaining the reference pixel position information to which the motion vector directs in the reference picture, and spatially neighboring pixel information of the current prediction unit in the current picture; and a processing unit 1302, for performing the interpolation filtering processing according to the following formula:

$$p_{i,j} = \sum_{m=-2}^{2} \sum_{n=-2}^{2} \alpha_{m,n} \gamma_{i-m,j-n}$$

By taking luminance as an example, wherein $\gamma_{i,j}$ is the luminance value of the pixel from the current picture or reference picture participating in filtering of the current prediction unit in the current picture, $p_{i,j}$ is the luminance value of the prediction pixel obtained by the interpolation filtering processing, $\alpha_{m,n}$ is the filter coefficient, (i, j) is the position of the current pixel, and (m, n) is the position of the prediction pixel.

If (i−m)<0 and (j−n)<3, or (j−n)<0, $\gamma_{i-m,j-n}$ is the luminance value from the current picture; otherwise, $\gamma_{i-m,j-n}$ is the luminance value of the pixel from reference picture.

If taking chroma as an example, in the above formula, $\gamma_{i,j}$ is the chroma value of the pixel from the current picture or reference picture participating in filtering of the current prediction unit in the current picture, $p_{i,j}$ is the chroma value of the prediction pixel obtained by the interpolation filtering processing, $\alpha_{m,n}$ is the filter coefficient, (i, j) is the position of the current pixel, and (m, n) is the position of the prediction pixel. If (i−m)<0 and (j−n)<3, or (j−n)<0, $\gamma_{i-m,j-n}$ is the chroma value from the current picture; otherwise, $\gamma_{i-m,j-n}$ is the chroma value of the pixel from the reference picture.

Figure 14:
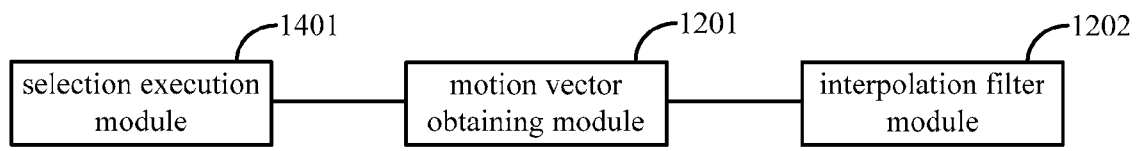
FIG. 14 is a schematic diagram of the structure of an example of the video decoder as shown in FIG. 12 of the embodiment of the invention.

As shown in FIG. 14, in one embodiment, the video decoder as shown in FIG. 12 may comprise:

a selection execution module 1401, for selecting to start the video decoder shown in FIG. 12 to perform execution according to the coding value obtained by the CABAC.

To sum up, in the embodiment of the present invention, the motion estimation is performed over integer pixel positions of a reference picture, to determine an optimal motion vector for a current prediction unit in a current picture; and the interpolation filtering processing is performed for motion estimation over fractional pixel position by using the integer pixel position information to which the optimal motion vector directs in the reference picture, and spatially neighboring pixel information of the current prediction unit in the current picture, which not only utilizes the information of both the reference picture and the current picture simultaneously to perform inter picture prediction, but also improves the inter picture prediction from the motion estimation phase by using the spatially neighboring pixel information of the current prediction unit in the current picture, thereby improving the video coding efficiency, reducing the bit rate necessary for provision of the same video quality, and also reducing nonzero prediction residual signal so as to facilitate the reduction of blocking artifacts.

In the embodiment of the present invention, decoding is performed to obtain a motion vector in a current decoding unit; and for fractional pixel motion vector, the interpolation filtering processing is performed by using reference pixels to which the optimal motion vector directs in a reference picture, and spatially neighboring pixels of the current prediction unit in the current picture, which not only utilizes the information of both the reference picture and the current picture simultaneously to perform inter picture prediction, but also, at the coding end, improves the inter picture prediction from the motion estimation phase by using the spatially neighboring pixel information of the current prediction unit in the current picture, thereby improving the video decoding efficiency, reducing the bit rate necessary for provision of the same video quality, and also reducing nonzero prediction residual signal so as to facilitate the reduction of blocking artifacts.

Persons skilled in the art shall understand that the embodiment of the invention can be provided as a method, system, or computer program product. Therefore, the invention can adopt the form of hardware-only embodiment, software-only embodiment, or the software-hardware combined embodiment. Moreover, the invention can adopt the form of computer program product implemented on one or more computer applicable storage media (comprising, but not be limited to, disc storage, CD-ROM and optical memory, etc.) containing the computer applicable program codes therein.

The invention is described with reference to the flow charts and/or block diagrams of the method, apparatus (system) and computer program product according to the embodiment of the invention. It is to understand that each process and/or block in the flow chart and/or block diagram, and combination of the flow and/or block in the flow chart and/or block diagram can be implemented by the computer program instructions. The computer program instructions can be provided to processors of the general-purpose computers, special purpose computers, embedded processors or other programmable data processing apparatuses to generate one machine, so as to generate a device for implementing the function specified in one or more flows in the flow chart and/or one or more blocks in the block diagrams by the instructions executed by the processors of the computers or other programmable data processing apparatuses.

The computer program instructions can be also stored in the computer readable memory capable of leading the computer or other programmable data processing apparatuses to operate in a specific way, so that the instructions stored in the computer readable memory generate the manufacturing product containing the instruction device which implements the functions specified in one or more flows in the flow charts and/or one or more blocks in the block diagrams.

The computer program instructions can be also loaded onto the computer or other programmable data processing apparatuses, such that the computer or other programmable apparatuses execute a series of operation steps to generate the processing implemented by the computer, so as to provide the step for implementing the functions specified in one or more flows in the flow charts and/or one or more blocks in the block diagrams by the instructions executed on the computers or other programmable apparatuses.

The above embodiments further explain the objects, technical solution and advantageous effects of the invention in detail. It is to understand that the above is only specific embodiments of the invention but not to limit the protection scope of the invention. Any amendments, equivalents, improvements and so on made within the spirit and principle of the invention are included inside the protection scope of the invention.

What is claimed is:

1. An inter picture prediction method for video coding, comprising:

performing motion estimation over integer pixel positions of a reference picture, to determine an optimal motion vector for a current prediction unit in a current picture; and performing interpolation filtering processing for motion estimation over fractional pixel position by using integer pixel position information to which the optimal motion vector directs in the reference picture, and spatially neighboring pixel information of the current prediction unit in the current picture, wherein the performing of the interpolation filtering processing for motion estimation over fractional pixel position by using the integer pixel position information to which the optimal motion vector directs in the reference picture, and the spatially neighboring pixel information of the current prediction unit in the current picture includes:

performing interpolation filtering processing in accordance with the following formula $$p_{i,j} = \sum_{m=-2}^{2} \sum_{n=-2}^{2} \alpha_{m,n} \gamma_{i-m,j-n}$$

wherein $\gamma^{i,j}$ is a luminance value of a current pixel from the current picture or reference picture participating in filtering of the current prediction unit in the current picture, $P^{i,j}$ is a luminance value of a prediction pixel obtained by the interpolation filtering processing, $\alpha^{m,n}$ is a filter coefficient, (i, j) is the position of the current pixel, and (m, n) is the position of the prediction pixel; and if (i-m)<0 and (j-n)<3, or (j-n)<0, then $\gamma^{i-m,j-n}$ is the luminance value from the current picture; otherwise, $\gamma^{i-m,j-n}$ is the luminance value of the pixel from the reference picture.

2. The method according to claim 1, wherein the performing of the interpolation filtering processing by using the integer pixel position information to which the optimal motion vector directs in the reference picture, and the spatially neighboring pixel information of the current prediction unit in the current picture, includes:
performing interpolation filtering processing in accordance with the following formula $$q_{g,h} = \sum_{r=-2}^{2} \sum_{s=-2}^{2} \beta_{r,s} \varphi_{g-r,h-s}$$

wherein $\phi_{g,h}$ is a chroma value of the current pixel from the current picture or reference picture participating in the filtering of the current prediction unit in the current picture, $q_{g,h}$ is a chroma value of the prediction pixel obtained by the interpolation filtering processing, $\beta_{r,s}$ is the filter coefficient, (g, h) is the position of the current pixel, and (r, s) is the position of the prediction pixel; and if (g-r) <0 and (h-s) <3, or (h-s) <0, then $\phi_{g-r,h-s}$ is the chroma value from the current picture; otherwise, $\phi_{g,h}$ is the chroma value of the pixel from the reference picture.

3. The method according to claim 2, further including:
according to a coding value obtained by context-adaptive binary arithmetic coding (CABAC), the method is selected to execute inter picture prediction for video coding.

4. The method according to claim 1, further including:
performing motion estimation over integer and fractional pixel positions based on interpolated samples from the interpolation filtering processing; and
selecting the optimal motion vector which provides an optimal prediction for coding of the current prediction unit according to a motion estimation result.

5. The method according to claim 4, further including:
according to a coding value obtained by context-adaptive binary arithmetic coding (CABAC), the method is selected to execute inter picture prediction for video coding.

6. The method according to claim 4, wherein performing motion estimation on the fractional pixel positions based on the interpolated values obtained from the interpolation filtering processing includes:
performing motion estimation to determine motion vectors at the fractional pixel positions for coding.

7. The method according to claim 6, further including:
according to a coding value obtained by context-adaptive binary arithmetic coding (CABAC), the method is selected to execute inter picture prediction for video coding.

8. The method according to claim 4, wherein selecting the optimal motion vector for inter picture prediction and coding of the current picture according to the motion estimation result includes:
selecting a motion vector corresponding to a minimum rate-distortion cost (RDcost) as the optimal motion vector, which provides an optimal prediction information for coding of the current picture according to the motion estimation result.

9. The method according to claim 8, further including:
according to a coding value obtained by context-adaptive binary arithmetic coding (CABAC), the method is selected to execute inter picture prediction for video coding.

10. The method according to claim 1, further including:
according to a coding value obtained by context-adaptive binary arithmetic coding (CABAC), the method is selected to execute inter picture prediction for video coding.

11. An inter picture prediction method for video decoding, comprising:
performing decoding to obtain a motion vector in a current decoding unit; and
for a fractional pixel motion vector, performing interpolation filtering processing by using reference pixels to which the optimal motion vector directs in a reference picture, and spatially neighboring pixels of a current prediction unit in the current picture,
wherein the performing of the interpolation filtering processing by using the integer pixel position information to which the motion vector directs in the reference picture, and the spatially neighboring pixel information of the current prediction unit in the current picture includes:
performing interpolation filtering processing in accordance with the following formula $$p_{i,j} = \sum_{m=-2}^{2} \sum_{n=-2}^{2} \alpha_{m,n} \gamma_{i-m,j-n}$$

wherein $\gamma_{i,j}$ is a luminance value of a current pixel from the current picture or reference picture participating in filtering of the current prediction unit in the current picture, $P_{i,j}$ is a luminance value of a prediction pixel obtained by the interpolation filtering processing, $\alpha_{m,n}$ is a filter coefficient, (i, j) is a position of the current pixel, and (m, n) is a position of the prediction pixel; and if (i-m)<0 and (j-n)<3, or (j-n)<0, then $\gamma_{i-m,j-n}$ is a luminance value from the current picture; otherwise, $\gamma_{i-m,j-n}$ is a luminance value of the current pixel from the reference picture.

12. The method according to claim 11, wherein the performing of the interpolation filtering processing by using the integer pixel position information to which the motion vector directs in the reference picture, and spatially neighboring pixel information of the current prediction unit in the current picture comprises:
performing interpolation filtering processing in accordance with the following formula $$q_{g,h} = \sum_{r=-2}^{2} \sum_{s=-2}^{2} \beta_{r,s} \varphi_{g-r,h-s}$$

wherein $\phi_{g,h}$ is a chroma value of the current pixel from the current picture or reference picture participating in filtering of the current prediction unit in the current picture, $q_{g,h}$ is a chroma value of the prediction pixel obtained by the interpolation filtering processing, $\beta_{r,s}$ is the filter coefficient, (g, h) is the position of the current pixel, and (r, s) is the position of the prediction pixel; and if (g-r) <0 and (h-s) <3, or (h-s) <0, then $\phi_{g-r,h-s}$ is the chroma value from the current picture; otherwise, $\phi_{g-r,h-s}$ is the chroma value of the pixel from the reference picture.

13. The method according to claim 12, further including:
according to a coding value obtained by context-adaptive binary arithmetic coding (CABAC), the method is selected to execute inter picture prediction for video decoding.

14. The method according to claim 11, further including:
according to a coding value obtained by context-adaptive binary arithmetic coding (CABAC), the method is selected to execute inter picture prediction for video decoding.

15. A video coder, comprising:
a processor; and
a computer readable storage device coupled to the processor and including computer readable instructions which, when executed, cause the processor to:
  perform motion estimation over integer pixel positions of a reference picture, to determine an optimal motion vector for a current prediction unit in a current picture; and
  perform interpolation filtering processing for motion estimation over fractional pixel position by using integer pixel position information to which the optimal motion vector directs in the reference picture, and using spatially neighboring pixel information of the current prediction unit in the current picture,
  obtain the integer pixel position information to which the optimal motion vector directs in the reference picture, and the spatially neighboring pixel information of the current prediction unit in the current picture; and
  perform the interpolation filtering processing according to the following formula:

$$p_{i,j} = \sum_{m=-2}^{2} \sum_{n=-2}^{2} \alpha_{m,n} \gamma_{i-m,j-n}$$

wherein $\gamma_{i,j}$ is a luminance value of a current pixel from the current picture or reference picture participating in filtering of the current prediction unit in the current picture, $P_{i,j}$ is a luminance value of a prediction pixel obtained by the interpolation filtering processing, $\alpha_{m,n}$ is a filter coefficient, (i, j) is the position of the current pixel, and (m, n) is the position of the prediction pixel; and if (i-m)<0 and (j-n)<3, or (j-n)<0, then $\gamma_{i-m,j-n}$ is the luminance value from the current picture, otherwise, $\gamma_{i-m,j-n}$ is the luminance value of the pixel from the reference picture.

16. The video coder according to claim 15, wherein the instructions are further to cause the processor to:
  obtain the integer pixel position information to which the optimal motion vector directs in the reference picture, and spatially neighboring pixel information of the current prediction unit in the current picture; and
  perform the interpolation filtering processing according to the following formula:

$$q_{g,h} = \sum_{r=-2}^{2} \sum_{s=-2}^{2} \beta_{r,s} \varphi_{g-r,h-s}$$

wherein $\phi_{g,h}$ is a chroma value of the current pixel from the current picture or reference picture participating in the filtering of the current prediction unit in the current picture, $q_{g,h}$ is a chroma value of the prediction pixel obtained by the interpolation filtering processing, $\beta_{r,s}$ is the filter coefficient, (g, h) is the position of the current pixel, and (r, s) is the position of the predicted pixel; and if (g-r) <0 and (h-s) <3, or (h-s) <0, then $\phi_{g-r,h-s}$ is the chroma value from the current picture; otherwise, $\phi_{g-r,h-s}$ is the chroma value of the pixel from the reference picture.

17. The video coder according to claim 16, wherein the instructions are to cause the processor to:
  select to start the video coder to perform execution according to a coding value obtained by context-adaptive binary arithmetic coding (CAB AC).

18. The video coder according to claim 15, wherein the instructions are to cause the processor to:
  perform motion estimation over integer and fractional pixel positions based on interpolated samples from the interpolation filtering processing; and
  select the optimal motion vector which provides an optimal prediction for coding of the current prediction unit according to a motion estimation result.

19. The video coder according to claim 18, wherein the instructions are to cause the processor to:
  select to start the video coder to perform execution according to a coding value obtained by context-adaptive binary arithmetic coding (CABAC).

20. The video coder according to claim 18, wherein the instructions are to cause the processor to:
  perform the motion estimation to determine motion vectors at fractional pixel positions for coding.

21. The video coder according to claim 20, wherein the instructions are to cause the processor to:
  select to start the video coder to perform execution according to a coding value obtained by context-adaptive binary arithmetic coding (CABAC).

22. The video coder according to claim 18, wherein the instructions are to cause the processor to:
  select a motion vector corresponding to a minimum rate-distortion cost (RDcost) according to the motion estimation result; and
  determine the selected motion vector as the optimal motion vector, which provides an optimal prediction information for coding of the current picture.

23. The video coder according to claim 22, wherein the instructions are to cause the processor to:
  select to start the video coder to perform execution according to a coding value obtained by context-adaptive binary arithmetic coding (CABAC).

24. The video coder according to claim 15, wherein the instructions are to cause the processor to:
   select to start the video coder to perform execution according to a coding value obtained by context-adaptive binary arithmetic coding (CABAC).

25. A video decoder, comprising:
   a processor; and
   a computer readable storage device coupled to the processor and including computer readable instructions which, when executed, cause the processor to:
      perform decoding to obtain a motion vector in a current decoding unit; and
      perform, for a fractional pixel motion vector, interpolation filtering processing by using reference pixels to which the optimal motion vector directs in a reference picture, and spatially neighboring pixels of the current prediction unit in a current picture,
      obtain the reference pixel position information to which the motion vector directs in the reference picture, and spatially neighbor pixel information of the current prediction unit in the current picture; and
      perform the interpolation filtering processing according to the following formula:

$$p_{i,j} = \sum_{m=-2}^{2} \sum_{n=-2}^{2} \alpha_{m,n} \gamma_{i-m,j-n}$$

wherein $\gamma_{i,j}$ is a luminance value of a current pixel from the current picture or reference picture participating in filtering of the current prediction unit in the current picture, $P_{i,j}$ is a luminance value of a prediction pixel obtained by the interpolation filtering processing, $\alpha_{m,n}$ is a filter coefficient, (i, j) is the position of the current pixel, and (m, n) is the position of the prediction pixel; and
   if (i-m)<0 and (j-n)<3, or (j-n)<0, then $\gamma_{i-m,j-n}$ is the luminance value from the current picture, otherwise, $\gamma_{i-m,j-n}$ is the luminance value of the pixel from the reference picture.

26. The video decoder according to claim 25, wherein the instructions are to cause the processor to:
   obtain the reference pixel position information to which the motion vector directs in the reference picture, and spatially neighboring pixel information of the current prediction unit in the current picture; and
   perform the interpolation filtering processing according to the following formula:

$$q_{g,h} = \sum_{r=-2}^{2} \sum_{s=-2}^{2} \beta_{r,s} \varphi_{g-r,h-s}$$

wherein $\phi_{g,h}$ is a chroma value of the current pixel from the current picture or reference picture participating in the filtering of the current prediction unit in the current picture, $q_{g,h}$ is a chroma value of the prediction pixel obtained by the interpolation filtering processing, $\beta_{r,s}$ is the filter coefficient, (g, h) is the position of the current pixel, and (r, s) is the position of the predicted pixel; and
   if (g-r) <0 and (h-s) <3, or (h-s) <0, then $\phi_{g-r,h-s}$ is the chroma value from the current picture; otherwise, $\phi_{g-r,h-s}$ is the chroma value of the pixel from the reference picture.

27. The video decoder according to claim 26, wherein the instructions are to cause the processor to:
   select to start the video decoder to perform execution according to a coding value obtained by the context-adaptive binary arithmetic coding (CABAC).

28. The video decoder according to claim 25, wherein the instructions are to cause the processor to:
   select to start the video decoder to perform execution according to a coding value obtained by context-adaptive binary arithmetic coding (CABAC).

* * * * *